United States Patent [19]
Chowdhury

[11] Patent Number: 6,097,863
[45] Date of Patent: Aug. 1, 2000

[54] DIFFRACTION GRATING WITH REDUCED POLARIZATION SENSITIVITY

[75] Inventor: Dipakbin Qasem Chowdhury, Coring, N.Y.

[73] Assignee: Corning Incorporated, Corning, N.Y.

[21] Appl. No.: 09/326,310

[22] Filed: Jun. 7, 1999

Related U.S. Application Data

[62] Division of application No. 09/029,590, May 18, 1998, Pat. No. 5,966,483.

[51] Int. Cl.$^7$ ........................................... G02B 6/34
[52] U.S. Cl. ................................. 385/37; 359/566
[58] Field of Search ................... 385/37, 31, 47; 359/566, 618

[56] References Cited

U.S. PATENT DOCUMENTS

| | | | |
|---|---|---|---|
| 4,111,524 | 9/1978 | Tomlinson, III | 385/37 |
| 4,153,330 | 5/1979 | Tomlinson, III | 385/37 |
| 4,385,799 | 5/1983 | Soref | 385/37 |
| 4,571,024 | 2/1986 | Husbands | 385/37 |
| 4,741,588 | 5/1988 | Nicia et al. | 350/96.19 |
| 5,208,701 | 5/1993 | Maeda | 359/574 |
| 5,581,405 | 12/1996 | Meyers et al. | 359/571 |
| 5,589,983 | 12/1996 | Meyers et al. | 359/566 |
| 5,638,212 | 6/1997 | Meyers et al. | 359/569 |

*Primary Examiner*—Akm E. Ullah
*Attorney, Agent, or Firm*—Edward F. Murphy

[57] ABSTRACT

A multiplexer/demultiplexer for routing different wavelength signals between a common pathway for conveying a plurality of the signals, and individual pathways for separately conveying the signals includes a reflective diffraction grating with reduced polarization sensitivity for dispersing the signals. The grating includes facets that are oriented for reducing efficiency variations within a transmission bandwidth and that are shaped for reducing differences between the diffraction efficiencies in two orthogonal directions of differentiation.

2 Claims, 5 Drawing Sheets

… (6,097,863)

DIFFRACTION GRATING WITH REDUCED POLARIZATION SENSITIVITY

This application is a divisional of 09/029,590 filed on May 18, 1998 now U.S. Pat. No. 5,966,483.

TECHNICAL FIELD

The invention relates to the field of optical communications and the routing of different wavelength signals. Improvements to reflective diffraction gratings, which are used in communication systems for dispersing light by wavelength, are featured.

BACKGROUND OF THE INVENTION

Optical communication systems include devices, referred to as multiplexers, that route different wavelength signals from individual pathways into a common pathway and other devices, referred to as demultiplexers, that route the different wavelength signals from the common pathway back into the individual pathways. Often, the only difference between these devices is the direction of light travel through them.

The multiplexer/demultiplexer designs gaining widest acceptance are based on planar spectrographs containing phased arrays or reflective diffraction gratings. Within these devices, two optical mechanisms are used for routing the optical signals between the common and individual pathways—dispersion and focusing. Dispersion angularly distinguishes the different wavelength signals, and focusing converts the angularly distinguished signals into spatially distinguished signals.

For example, a focusing mechanism can be arranged to form discrete images of the common pathway in each wavelength of the different optical signals. The dispersing mechanism relatively displaces the images along a focal line by amounts that vary with the signal wavelengths. The individual pathways are arrayed along the focal line in positions aligned with the displaced images of the different wavelength signals. Thus, each different wavelength signal forms a discrete image of the common pathway in a different position along the focal line, and the individual pathways are located coincident with the image positions of the different wavelength signals.

The dispersing and focusing functions can be performed by phased arrays or reflective diffraction gratings. The phased arrays include a set of intermediate pathways (e.g., waveguides) that progressively vary in length to relatively incline wavefronts of different wavelength signals within a free spectral range. Confocal couplers connect the common and individual pathways to opposite ends of the intermediate pathways. Reflective diffraction gratings have a grating pattern that disperses the different wavelength signals at different diffraction angles and an overall shape that focuses the different wavelength signals in different positions along a so-called Rowland circle. Both the common and the individual pathways include inner ends located along the Rowland circle.

For small numbers of channels conveying different wavelength signals, the phased arrays work quite well but become more and more unwieldy with larger numbers of channels. Reflective diffraction gratings better accommodate large numbers of channels but are generally less efficient. One part of the problem is due to imperfections in the grating surface, and another part of the problem is due to polarization sensitivity.

Both problems can be reduced by enlarging grating pitch. However, the grating pitch is limited by other requirements of the design including wavelength dispersion, which decreases with increasing pitch. Additional dispersion can be obtained by increasing the diffraction order, but this decreases the free spectral range and increases efficiency variations between the different wavelength signals. Accordingly, efficiency improvements have been limited by competing design requirements.

The polarization of optical signals tends to fluctuate in optical communication systems, and the polarization sensitivity of the reflective diffraction gratings can cause large variations in transmission efficiency. Such large efficiency fluctuations lower signal-to-noise ratios of optical transmissions and require compensating amplification to avoid the loss of information.

U.S. Pat. No. 4,741,588 to Nicia et al. proposes to solve this problem in a multiplexer/demultiplexer by converting unpolarized light into substantially linearly polarized light before reaching a reflective diffraction grating. However, the conversion requires a special optical device formed by two prisms separated by a polarizing filter. The special device adds cost and complexity, and its use requires the focusing function to be performed by another optical element in advance of the reflective diffraction grating

SUMMARY OF THE INVENTION

My invention in one or more of its various embodiments modifies the profiles of reflective diffraction gratings to reduce their polarization sensitivity without requiring any additional optical elements. The resulting improved transmission efficiencies make my reflective diffraction gratings more viable for dispersing different wavelength signals within optical routing systems such as multiplexers and demultiplexers.

The reflective diffraction gratings improved by my invention exhibit a first diffraction efficiency in one of two orthogonal directions of polarization and a second diffraction efficiency in the other orthogonal direction of polarization. One embodiment includes a substrate supporting a plurality of reflective faces oriented at respective blaze angles for concentrating spectral energy within a limited angular region and a plurality of side walls for interconnecting the reflective faces. Rounded corners having convex reflective profiles join one end of the reflective faces to some of the side walls, and rounded corners having concave reflective profiles join the other end of the reflective faces to other of the side walls. At least theoretically, sharp corners are preferred, but manufacturing limitations make some rounding inevitable.

Overall diffraction efficiency is known to vary inversely with the size of the rounded corners. However, I have discovered that the size of the rounded corners with concave profiles can be varied to affect the diffraction efficiency in one direction of polarization substantially more than the diffraction efficiency in the other direction of polarization. Accordingly, for a given size of the convex corners, the size of the concave corners can be varied to reduce differences between the diffraction efficiencies in the two directions of polarization.

The first and second diffraction efficiencies vary as a function of wavelength over a predetermined transmission bandwidth and include first and second peak diffraction efficiencies at different wavelengths. According to a further aspect of my invention, the reflective faces are oriented at blaze angles that relatively adjust the different wavelengths of the first and second peak diffraction efficiencies to reduce asymmetries between efficiencies at opposite ends of the transmission bandwidth. The required blaze angles retroreflect normal incident light of a blaze wavelength that is different from a median wavelength of the bandwidth.

Thus, the corners of the reflective faces are preferably relatively sized for minimizing differences between the peak diffraction efficiencies in the two directions of polarization, and the reflective faces are preferably oriented for minimizing differences between efficiencies at opposite ends of the transmission bandwidth. Together, these two improvements reduce differences between the diffraction efficiencies in the two polarization directions as well as variations in diffraction efficiency throughout the transmission bandwidth

DRAWINGS

Figure 9A:
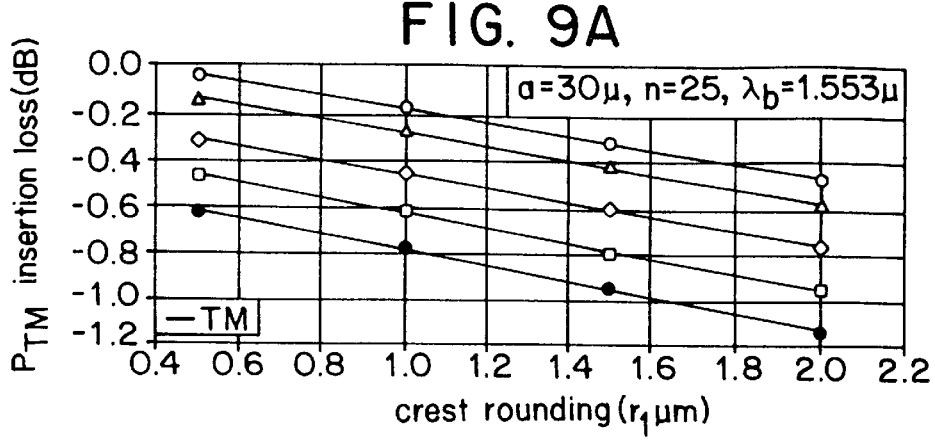
Figure 9B:
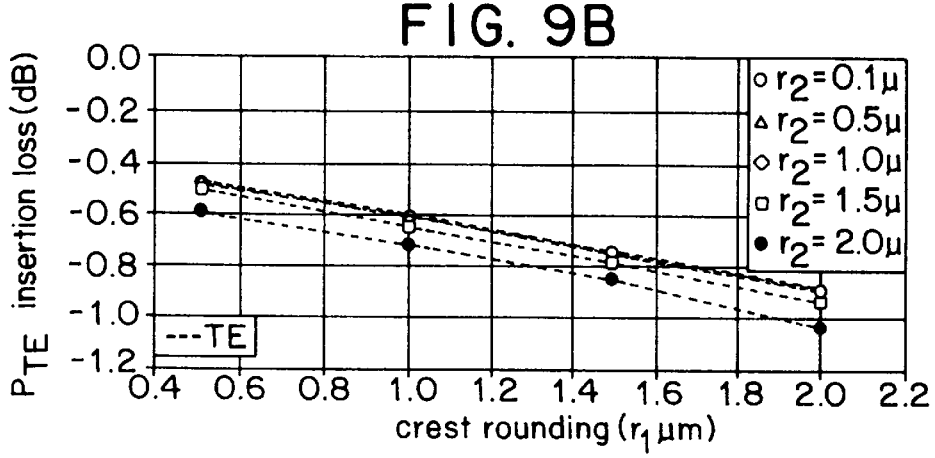

FIGS. 9A and 9B separately graph signal loss as a function of crest corner rounding in each of the polarization directions for several different values of trough rounding.

Figure 10:
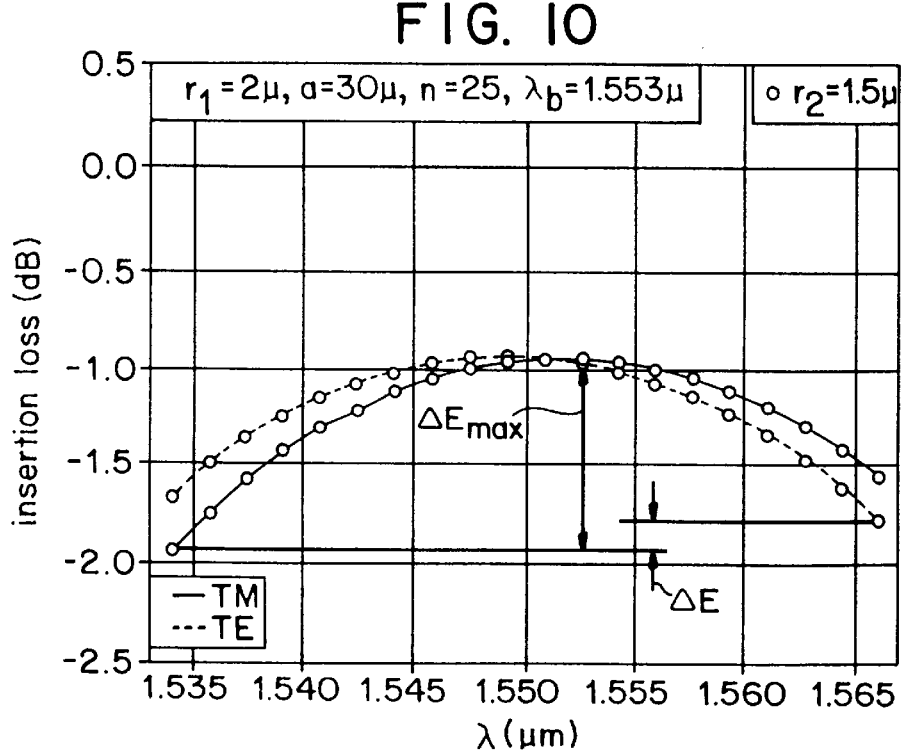

FIG. 10 is a graph of signal loss varying as a function of wavelength showing improvements in polarization sensitivity between the two directions of polarization.

DETAILED DESCRIPTION

Figure 1:
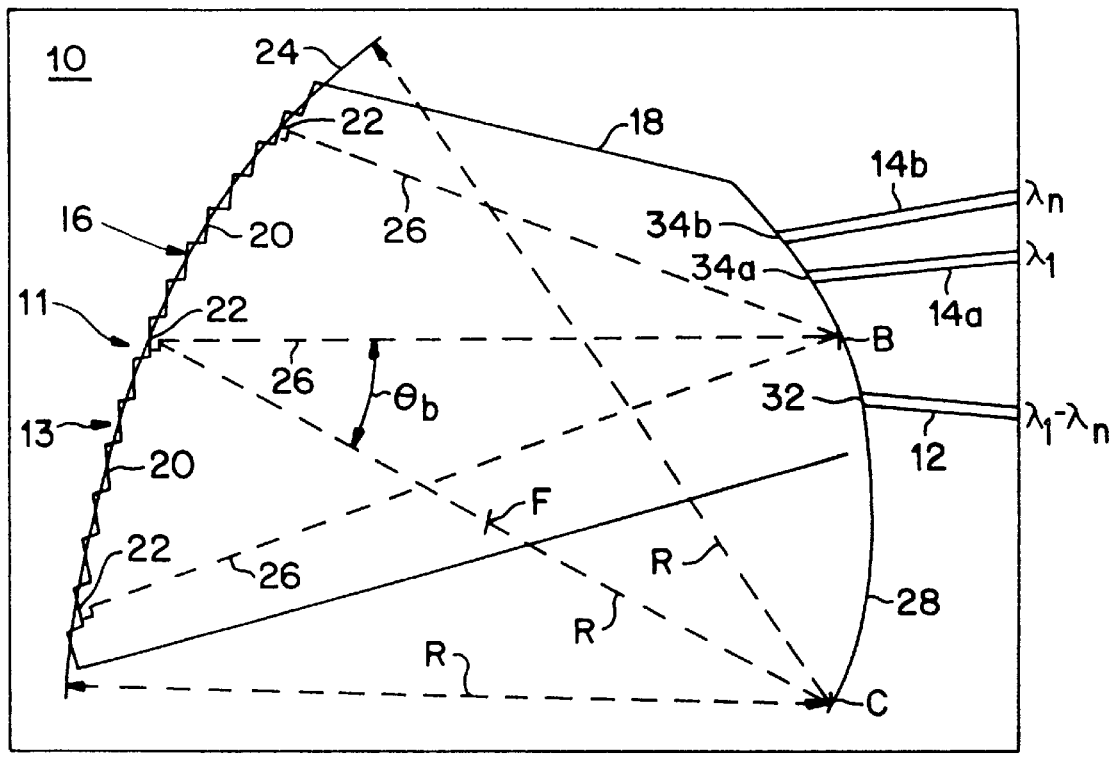
FIG. 1 is a diagram of a multiplexer/demultiplexer based on a Rowland circle design.

A multiplexer/demultiplexer 10, shown in FIG. 1, is implemented as an integrated planar optic interconnecting a common waveguide (pathway) 12 for conveying a plurality of different wavelength signals "$\lambda_1$–$\lambda_n$" with an array of individual waveguides (pathways) 14a–14b for separately conveying the different wavelength signals "$\lambda_1$" and "$\lambda_n$". For simplicity of illustration, only two of the individual waveguides 14a and 14b are shown, but many more are ordinarily used. A reflective diffraction grating 16 couples the common and individual waveguides 12 and 14a–b through a central slab waveguide (central pathway) 18.

Wile it is possible to use a flat diffraction grating for wavelength dispersion and to use a separate optical element, such as a lens or mirror for focusing, the reflective diffraction grating 16 is curved for performing both the dispersing and the focusing functions. A stepwise succession of facets 20 having centers 22 are positioned along an arc 24 defined by a radius "R" and a center of curvature "C". The facets 20 are oriented at blaze angles "$\theta_b$" (see also FIG. 2) so that lines 26 extending perpendicular to the facets 20 from their respective centers 22 converge toward a single blaze point "B". Both the blaze point "B" and the center of curvature "C" are located along a so-called Rowland circle 28 that is typically tangent to the reflective grating 16 with a diameter equal to the grating's radius of curvature "R". A focal point "F", which has infinity as its conjugate, coincides with the center of the Rowland circle 28.

Also located along the Rowland circle 28 are inner end 32 of the common waveguide 12 and inner ends 34a and 34b of the individual waveguides 14a and 14b. The Rowland circle 28 defines a focal line along which image and object conjugates of the inner ends 32, 34a, and 34b are located. In a demultiplexing mode, each of the different wavelength signals "$\lambda_1\lambda_n$" launched by the common waveguide 12 is projected as an image of its inner end 32 onto a different one of the individual waveguide inner ends 34a and 34b. In a multiplexing mode, images of the inner ends 34a–b of the individual waveguides 14 are collectively projected onto the inner end 32 of the common waveguide 12.

Several additional considerations are accommodated in the design of the reflective diffraction grating 16. These include grating size, linear dispersion along the focal line, variations in diffraction efficiency with wavelength, polarization sensitivity, and sensitivity to profile imperfections. Various relationships and competing interests of these design considerations are explained below.

Figure 2:
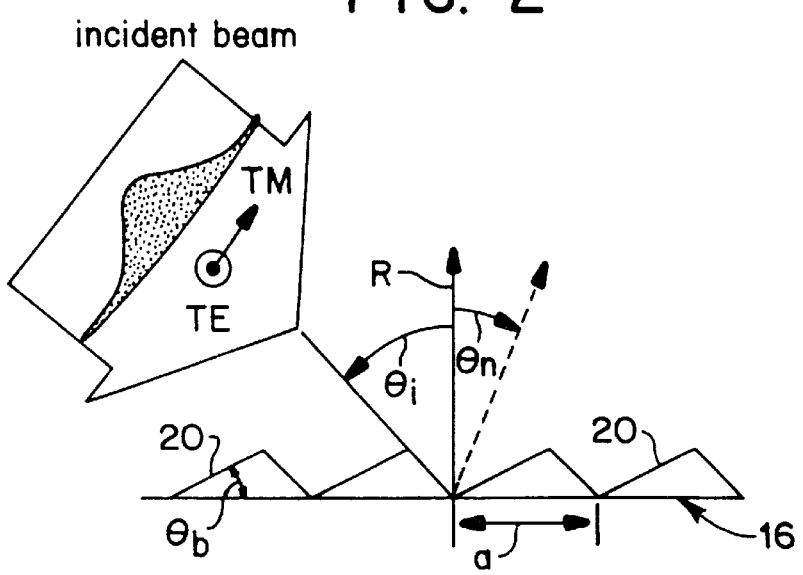
FIG. 2 is a diagram of an enlarged portion of my reflective diffraction grating relating various parameters of the design.

For example, angles of incidence and diffraction shown in FIG. 2 are related as follows:

$$\sin(\theta_i) = \sin(\theta_n) + \frac{m\lambda}{a}$$

where "$\theta_i$" is the angle of incidence, "$\theta_n$" is the angle of diffraction, "m" is the diffraction order, and "a" is the grating pitch.

A blaze wavelength "$\lambda_b$" is calculated by equating absolute values of the angles of incidence and diffraction "$\theta_i$" and "$\theta_n$" to the blaze angle "$\theta_b$" as follows:

$$\lambda_b = \frac{2a\sin(\theta_b)}{m}$$

Angles of incidence "$\theta_i$" substantially normal to the facets 20 establish so-called Littrow reflection conditions (i.e., $\theta_i=\theta_b$). The adjacent facets 20 are separated from each other in the direction of normal incidence by an amount equal to one-half of a product of the diffraction order "m" and the blaze wavelength "$\lambda_b$"—the later product representing the total optical path length difference between adjacent facets 20 at normal incidence.

Within a free spectral range surrounding the blaze wavelength "$\lambda_b$" (defined by a quotient of "$\lambda_b$" divided by "m"), only the blaze wavelength "$\lambda_b$" is diffracted without angular change. All other wavelengths "$\lambda$" within the free spectral range, whose optical path lengths between adjacent facets 20 are fractional multiples of their wavelength "$\lambda$", are angularly dispersed by amounts that increase as a function of their difference from the blaze wavelength "$\lambda_b$". This angular dispersion "$\delta\theta_n$" can be calculated as follows:

$$\delta\theta_n = \frac{m}{a\cos(\theta_n)}\delta\lambda$$

where "$\delta\lambda$" is the wavelength difference from the blaze wavelength "$\lambda_b$".

Linear dispersion "$\delta L$" of the different wavelengths "$\lambda$" measured as an arcuate distance along the focal line 28 is the simple product of the grating's radius of curvature "R" and the angular dispersion "δθ$_n$" as follows:

$$\delta L = R \delta \theta_n$$

Assuming near Littrow conditions, a diffraction efficiency function "e$_n$(λ)" is given as follows:

$$e_n(\lambda) = e_{no}^2 \text{sinc}^2 \left[ m\pi \frac{\delta\lambda}{\lambda} \right]$$

where "e$_{no}$" is the diffraction efficiency at the blaze wavelength "λ$_b$" for each direction of polarization, and the symbol "sinc" represents a function in the form "sin(x)/x". As shown in FIG. 2, the "TM" (transverse magnetic) direction of polarization extends parallel to the slab waveguide 18 (i.e., parallel to the plane of the Rowland circle 28) and the "TE" (transverse electric) direction of polarization extends perpendicular to the slab waveguide 18.

Figure 3:
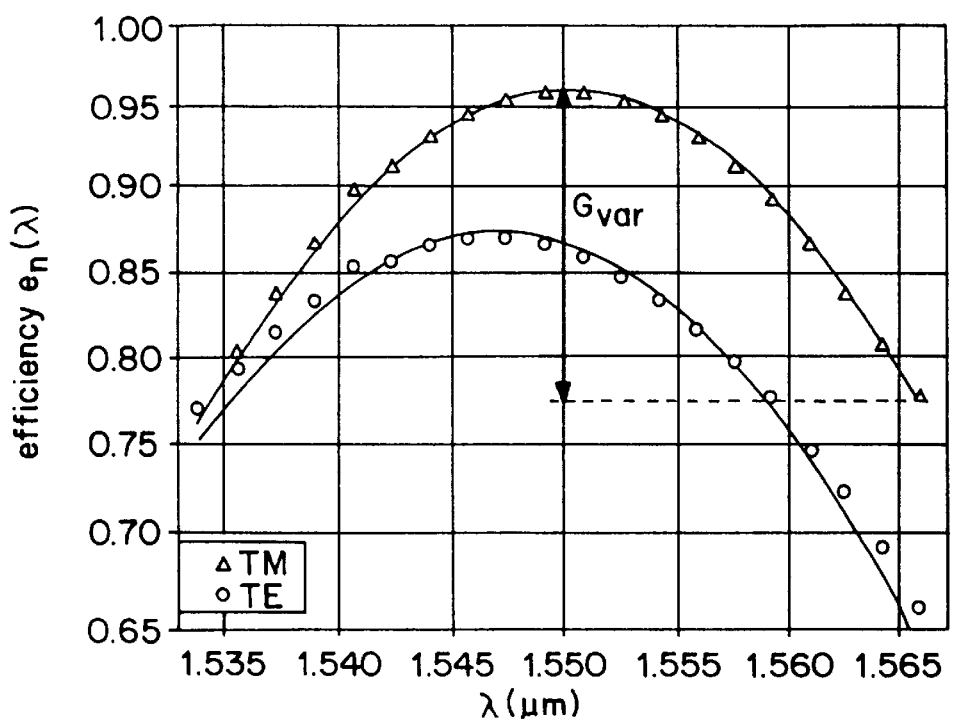
FIG. 3 is a graph of diffraction efficiency varying as a function of wavelength over a transmission bandwidth for two directions of polarization.

FIG. 3 plots exemplary values of the efficiency function "e$_n$(λ)" for both the "TM" and "TE" directions of polarization within a predetermined transmission bandwidth "Δλ" corresponding to the range of different wavelength signals transmitted by the multiplexer/demultiplexer 10. An efficiency variation "G$_{var}$" is the difference between a peak efficiency of "TM" polarization at the blaze wavelength "λ$_b$" and a minimum efficiency at an edge of the transmission bandwidth "Δλ".

Figure 4:
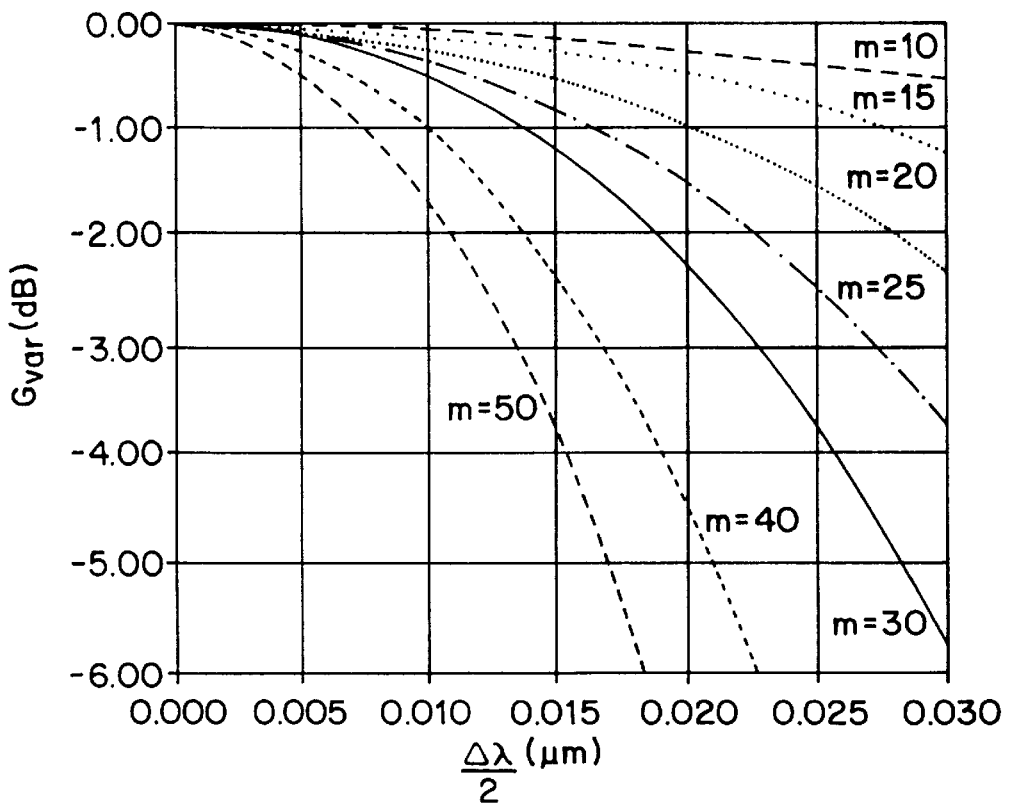
FIG. 4 is a graph of ranges of efficiency variations varying as a function of the size of the transmission bandwidth for different diffraction orders of the grating.

FIG. 4 compares the efficiency variations "G$_{var}$" in decibels over a range of transmission bandwidths "Δλ" between different diffraction orders "m". As is apparent from both the efficiency function "e$_n$(λ)" and the set of curves plotted in FIG. 4, the efficiency variation "G$_{var}$" (expressed as a loss in decibels) increases with both transmission bandwidth "Δλ" and diffraction order "m". The transmission bandwidth "Δλ" is generally a design requirement; however, diffraction order "m" can be optimized.

Preferably, the diffraction order "m" is minimized to reduce variations in transmission efficiency over the transmission bandwidth "Δλ". However, reductions in diffraction order "m" also directly reduce linear dispersion "δL" of the different wavelength signals along the focal line 28. The required linear dispersion "δL" can be maintained by reducing grating pitch "a" to compensate for the reduction in diffraction order "m". However, reducing pitch "a" can cause other problems.

Figure 5:
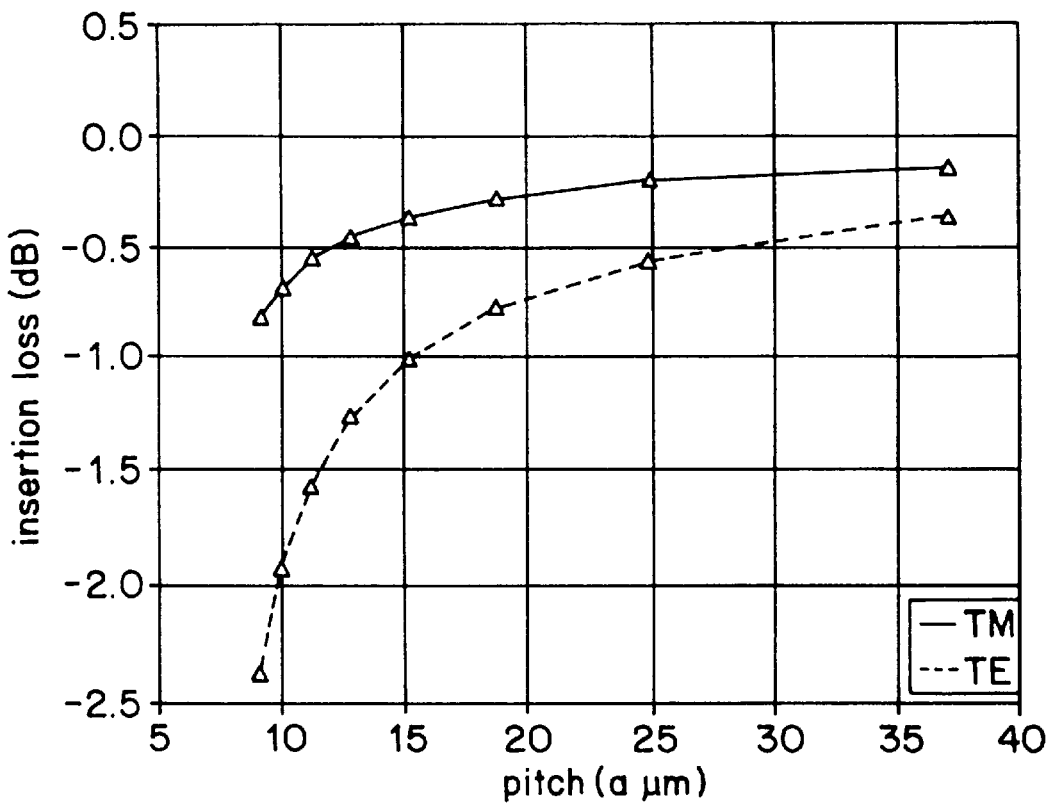
FIG. 5 is a graph of signal loss varying as a function of grating pitch for the two directions of polarization.

For example, FIG. 5 demonstrates that overall diffraction efficiencies "e$_{no}$" (plotted as insertion losses in decibels) in the two directions of polarization "TM" and "TE" decrease with decreasing pitch and the differences in efficiency (i.e., insertion loss) between the two directions of polarization "TM" and "TE" increase with decreasing pitch. (Note: Insertion loss is calculated as the product of ten times the common logarithm of the efficiency; and increasingly negative values, which correspond to reductions in efficiency, are regarded as larger insertion losses.) Increased sensitivity to imperfections explains the increased insertion losses with reductions in pitch "a". Drastic differences in the insertion loss between the two directions of polarization occur as the grating pitch "a" approaches wavelengths within the transmission band "Δλ".

My preferred designs have (a) a pitch "a" that is at least a multiple of five times the blaze wavelength "λ$_b$" to limit variations in diffraction efficiency between the two directions of polarization and (b) a diffraction order "m" that is no greater than 40 for a transmission bandwidth "Δλ" of 20 nm or more and no greater than 30 for a bandwidth "Δλ" of 32 nm or more to limit variations in diffraction efficiency between different wavelengths within the respective transmission bands "Δλ". The required linear dispersion "δL" is obtained by adjusting the grating's radius of curvature "R", which is otherwise set as small as possible to minimize the overall size of the multiplexer/demultiplexer 10.

Figure 6:
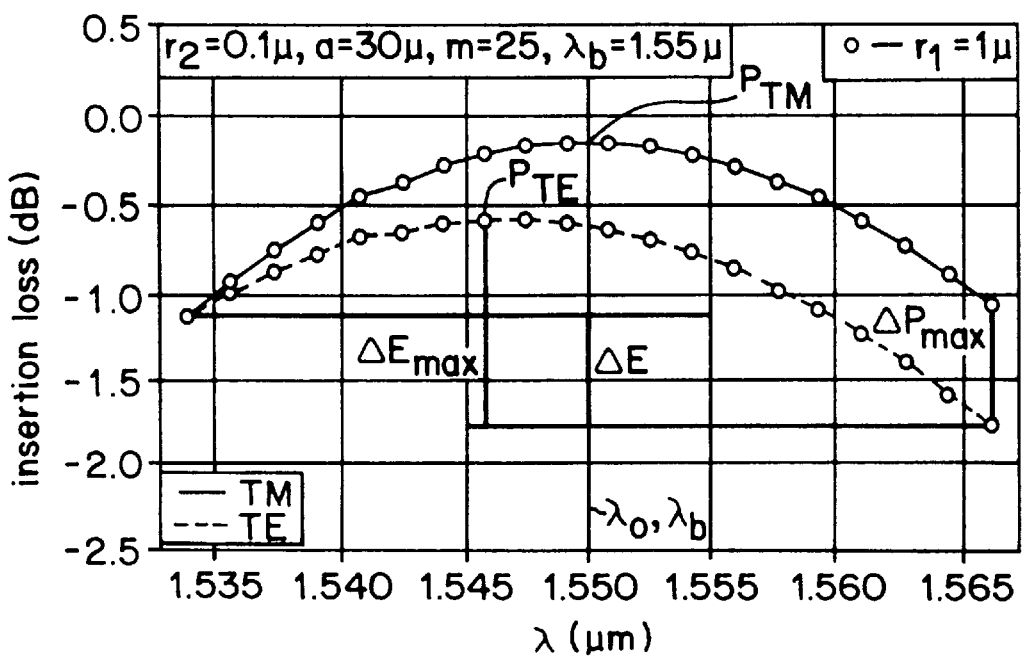
FIG. 6 is a graph of signal loss varying as a function of wavelength within a specified bandwidth illustrating key performance measures.

FIG. 6 depicts three performance measures that can be further optimized by my invention. They include: "ΔP$_{max}$", which is the maximum difference in insertion loss between the two directions of polarization at any one wavelength within the transmission band "Δλ", "ΔE$_{max}$", which is the maximum insertion loss variation of either polarization direction within the transmission band, and "ΔE", which is a portion of the maximum loss variation "ΔE$_{max}$" attributable to differences between insertion losses at opposite ends of the transmission band.

"ΔP$_{max}$" is partially limited by maximizing pitch "a", and "ΔE$_{max}$" is partially limited by minimizing diffraction order "m". However, significant efficiency differences remain between the two polarization directions "TM" and "TE". One part of the remaining problem is attributable to different wavelength positions of the peak efficiencies in the two polarization directions. Normally, the blaze wavelength "λ$_b$" is selected midway of the transmission band "Δλ" at a median wavelength "λ$_0$". As shown in FIG. 6, a peak efficiency "P$_{TM}$" of the "TM" polarization direction is positioned at the median wavelength "λ$_0$". However, a peak efficiency "P$_{TE}$" of the "TE" polarization direction is positioned at a shorter wavelength. The offset of the peak efficiency "P$_{TE}$" from the median wavelength "λ$_0$" is responsible for most of the loss variation "ΔE".

Figure 7:
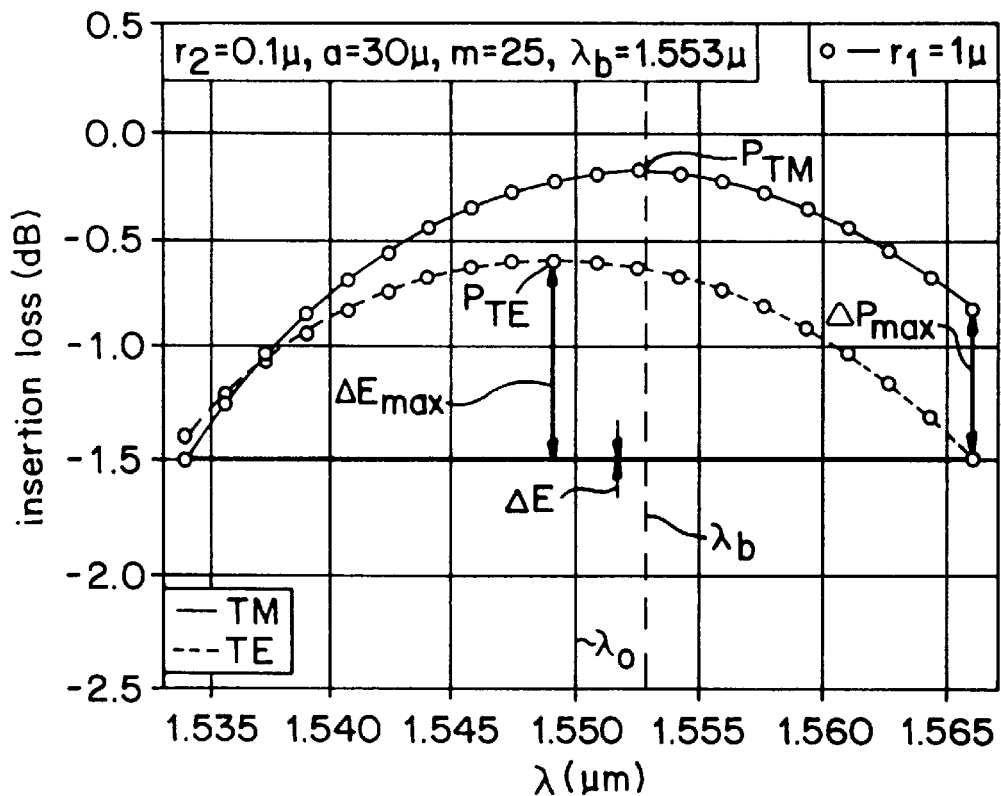
FIG. 7 is a similar graph of signal loss varying as a function of wavelength showing comparative effects of moving a blaze wavelength.

According to one aspect of my invention, the blaze wavelength "λ$_b$" is moved apart from the median wavelength "λ$_0$" to better balance insertion losses between opposite ends of the transmission band "Δλ". The blaze wavelength "λ$_b$" in the example illustrated in FIG. 7 is larger than the median wavelength "λ$_0$" for advancing the peak wavelength "P$_{TE}$" closer to the median wavelength "λ$_0$". As a result, the "ΔE" component of the maximum loss variation "ΔE$_{max}$" is nearly eliminated.

The reduction in the "ΔE" component of the "TE" loss variation "ΔE$_{max}$" can result in an increase in the "ΔE" component of the "TM" loss variation "ΔE$_{max}$". Accordingly, the blaze wavelength "λ$_b$" is preferably adjusted to balance the loss variations "ΔE$_{max}$" in both directions of polarization at a minimum value. Generally, this is accomplished by straddling the peak efficiencies "P$_{TE}$" and "P$_{TM}$" on either side of the median wavelength "λ$_0$".

Figure 8:
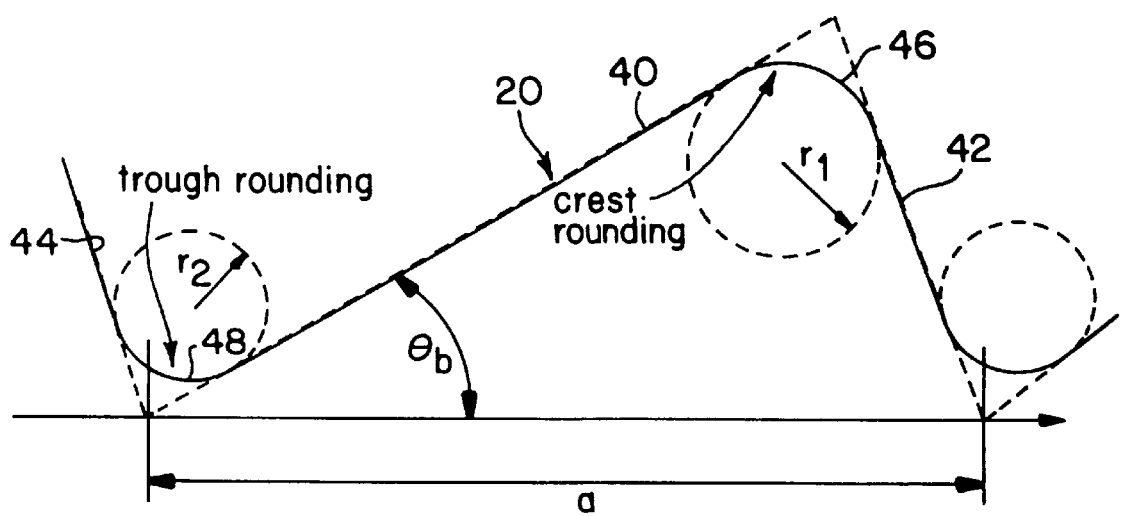
FIG. 8 is a further enlarged view of a portion of my diffraction grating showing trough and crest corner rounding at opposite ends of grating faces.

I have discovered another important characteristic of diffraction gratings which can be used to minimize the maximum difference in insertion loss "ΔP$_{max}$" between the two directions of polarization. FIG. 8 shows an enlarged facet 20 having a reflective face 40 joined to respective side walls 42 and 44 at opposite ends. A dashed line shows a theoretically perfect profile. However, rounded corners 46 and 48 are formed during manufacture.

The rounded corner 46 joins the front face 40 to the side wall 42 with a convex reflective profile, and the rounded corner 48 joins the front face 40 to the side wall 44 with a concave reflective profile. The corner 46, which has a radius "r$_1$", forms a crest of the facet 20; and the corner 48, which has a radius "r$_2$", forms a trough of the facet 20.

FIGS. 9A and 9B compare the peak efficiencies "P$_{TM}$" and "P$_{TE}$" (in units of decibel loss) over a range of variations in the radii "r$_1$" and "r$_2$". The figures show that increases in crest rounding radii "r$_1$" increase insertion losses (i.e., reduce efficiency) in both directions of polarization. Similar insertion losses accompany increases in trough rounding radii "$r_2$" for the "TM" direction of polarization. However, the trough rounding radii "$r_2$" has little effect on insertion losses in the "TE" direction of polarization. Accordingly, the trough rounding radii "$r_2$" can be used to vary diffraction efficiency in the "TM" direction of polarization largely independently of the diffraction efficiency in the "TE" direction of polarization.

The graph of FIG. 10 shows the significant reduction in polarization sensitivity made possible by the selection of a trough rounding radii "$r_2$" at which the peak efficiencies "$P_{TM}$" and "$P_{TE}$" approximately coincide in value. The improvement can also be expressed as a reduction in the maximum insertion loss difference "$\Delta P_{max}$" between the two polarization directions. The average of the two peak diffraction efficiencies "$P_{TM}$" and "$P_{TE}$" can be improved by minimizing the crest radius "$r_1$", and the difference between the two peak diffraction efficiencies "$P_{TM}$" and "$P_{TE}$" is minimized by further adjusting the trough radius "$r_2$".

In summary, the design of my preferred multiplexer/demultiplexer is guided by the following criteria: (a) minimize the diffraction order "m" to reduce the rate at which diffraction efficiency varies from the blaze wavelength "$\lambda_b$", (b) maximize the grating pitch "a" and minimize the crest radius "$r_1$" to limit overall insertion losses, (c) maintain the grating size "R" as small as possible while achieving a required linear dispersion "$\delta L$", (d) adjust the blaze wavelength "$\lambda_b$" with respect to the median wavelength "$\lambda_0$" to balance insertion losses at opposite ends of the transmission band "$\Delta \lambda$", and (e) adjust the trough radios "$r_2$" to minimize differences between the diffraction efficiencies in the two directions of polarization.

Details of the example plotted in FIG. 10 are listed below:

| Design Objectives | |
|---|---|
| Median wavelength "$\lambda_0$" | 1550 nm |
| Transmission bandwidth "$\Delta \lambda$" | 32 nm |
| Maximum insertion loss | 2 dB |
| Maximum loss variation "$\Delta E_{max}$" | 1 dB |
| Maximum polarization difference "$\Delta P_{max}$" | as low as possible |
| Design Variables | |
| Grating radius "R" | 2.185 cm |
| Grating order "m" | 25 |
| Grating pitch "a" | 30.0 μm |
| Blaze wavelength | 1553 nm |
| Crest radius "$r_1$" | 2.0 μm |
| Trough radius "$r_2$" | 1.5 μm |
| Polarization Results | |
| Maximum loss variation "$\Delta E_{max}$" | 0.98 dB |
| Asymmetry loss variation "$\Delta E$" | 0.14 dB |
| Maximum polarization difference "$\Delta P_{max}$" | 0.27 dB |

In the above example, the angle of incidence "$\theta_i$" is one degree greater than the blaze angle "$\theta_b$", which is calculated at 40.32 degrees. Incident angles within one or two degrees of the blaze angle are considered within an assumption of Littrow conditions.

My multiplexer/demultiplexer 10 is preferably manufactured on silicon or germanium substrates using photolithographic techniques for forming the grating 16 with facets 20 that extend perpendicular to the substrate. A reflective coating is preferably deposited behind the faces 40 of the facets 20 for providing the required reflectivity in the plane of the substrate.

Alternatively, my multiplexer/demultiplexer could be formed in bulk or hybrid optical components; and the grating could be manufactured by a variety of other techniques including hot pressing, replication, or etching. Although my new grating is primarily intended for use in multiplexers/demultiplexers, my grating can also be used in other optical devices that are also sensitive to variations in polarization.

Without limitation the following are examples of embodiments of the invention.

A diffraction grating for dispersing wavelengths of unpolarized light within a transmission bandwidth "$\Delta \lambda$" comprising: a substrate supporting a plurality of reflective faces that disperse the different wavelengths of unpolarized light; said grating exhibiting first and second diffraction efficiencies in two orthogonal directions of polarization; each of said diffraction efficiencies varying with wavelength between maximum and minimum values within said transmission bandwidth "$\Delta \lambda$"; and said reflective faces being oriented at respective blaze angles "$\theta_b$" for substantially retroreflecting normal incident light of a blaze wavelength "$\lambda_b$" that is different from a median wavelength "$\lambda_0$" of the transmission bandwidth "$\Delta \lambda$" by an amount that reduces a difference between said maximum and minimum values in one of said directions of polarization in which said blaze wavelength "$\lambda_b$" is different from said median wavelength "$\lambda_0$" of the transmission bandwidth "$\Delta \lambda$" by an amount that reduces differences between diffraction efficiencies at opposite ends of the transmission band "$\Delta \lambda$"; also in which the blaze wavelength "$\lambda_b$" is larger than the median wavelength "$\lambda_0$". The diffraction grating's first diffraction efficiency includes a first peak diffraction efficiency at a first wavelength and said second diffraction efficiency includes a second peak diffraction efficiency at a second wavelength; and also in which one of said first and second wavelengths is shorter than said median wavelength "$\lambda_0$", and the other of said first and second wavelengths is longer than said median wavelength "$\lambda_0$". This diffraction grating further comprises: a plurality of side walls interconnecting said reflective faces; first rounded corners having convex reflective profiles joining said faces to said side walls; second rounded corners having concave reflective profiles joining said faces to said side walls; and said second rounded corners being sized for reducing differences between said first and second peak diffraction efficiencies in the two directions of polarization; and also in which said first rounded corners have a radius of curvature "$r_1$", said second rounded corners have a radius of curvature "$r_2$", and said radius of curvature "$r_2$" being sized independently of said radius of curvature "$r_1$" within a range of values that varies one of the first and second peak diffraction efficiencies more than the other for matching the first and second peak efficiencies within one decibel. This diffraction grating is radius of curvature "$r_2$" is less than said radius of curvature "$r_1$". The diffraction grating further includes an optical path length difference between adjacent faces in a direction of Littrow reflection is equal to a product of the blaze wavelength "$\lambda_b$" and a diffraction order "m"; and also in which comparable portions of said faces are spaced at a grating pitch "a"; and the blaze angles "$\theta_b$" are related to the blaze wavelength "$\lambda_b$", the diffraction order "m", and the grating pitch "a" according to the following relationship:

$$\sin\theta_b = \frac{m\lambda_b}{2a}$$

and further in which the diffraction order "m" is less than 50, and the grating pitch "a" is more than 5 times the blaze wavelength "$\lambda_b$". Said faces of the diffraction grating are arranged for converting an angular dispersion of different wavelengths within the bandwidth "Δλ" into a linear dispersion of the different wavelengths along a focal line; and in which said faces are positioned along a circle having a radius "R".

An optical device for routing different wavelength signals within a transmission bandwidth "Δλ" comprising: a common pathway for conveying a plurality of the different wavelength signals; individual pathways for separately conveying the different wavelength signals; a diffraction grating interconnecting said common and individual pathways with a first diffraction efficiency in one of two orthogonal directions of polarization and a second diffraction efficiency in the other orthogonal direction of polarization; said first and second diffraction efficiencies varying as a function of wavelength within the transmission bandwidth "Δλ" between maximum and minimum values having a difference "$\Delta e_{max}$"; said first and second diffraction efficiencies differing from each other at correspondings wavelengths through a maximum difference "$\Delta P_{max}$"; and said reflective diffraction grating including reflective faces that are oriented for balancing the differences "$\Delta E_{max}$" in both directions of polarization and that are shaped for minimizing the difference "$\Delta P_{max}$" between the directions of polarization and further comprising: a plurality of side walls interconnecting said reflective faces; first rounded corners having convex reflective profiles joining said faces to said side walls; second rounded corners having concave reflective profiles joining said faces to said side walls; and said second rounded corners being sized independently of said first rounded corners for minimizing differences between said maximum efficiencies in the two directions of polarization. The device's first rounded corners have a radius of curvature "$r_1$", said second rounded corners have a radius of curvature "$r_2$", and said radius of curvature "$r_2$" being sized independently of said radius of curvature "$r_1$" within a range of values that varies one of the maximum efficiencies more than the other; and also said radius of curvature "$r_2$" is less than said radius of curvature "$r_1$"; and further said common and individual pathways are interconnected within a plane, one of said two orthogonal directions of polarization extends parallel to said plane, and the other orthogonal direction of polarization extends normal to said plane; and also variations in said radius of curvature "$r_2$" affect the diffraction efficiency associated with the direction of polarization that extends parallel to said plane more than the diffraction efficiency associated with the direction of polarization that extends perpendicular to the plane. The device's reflective faces are oriented at respective blaze angles "$\theta_b$" for substantially retroreflecting normal incident light of a blaze wavelength "$\lambda_b$" that is different from a median wavelength "$\lambda_0$" of the transmission bandwidth "Δλ" by an amount that reduces the difference "$\Delta E_{max}$" in one direction of polarization; and also the blaze wavelength "$\lambda_b$" is larger than the median wavelength "$\lambda_0$"; and further an optical path length difference between adjacent faces in a direction of Littrow reflection is equal to a product of the blaze wavelength "$\lambda_b$" and a diffraction order "m", which is no greater than 40 for transmission bandwidths "Δλ" spanning at least 20 nanometers; and also comparable portions of said faces are spaced at a grating pitch "a", which is at least a multiple of 5 times the blaze wavelength "$\lambda_b$"; and further the blaze angles "$\theta_b$" are related to the blaze wavelength "$\lambda_b$", the diffraction order "m", and the grating pitch "a" according to the following relationship:

$$\sin\theta_b = \frac{m\lambda_b}{2a}$$

The device's diffraction grating is arranged for converting an angular dispersion of different wavelengths within the bandwidth "Δλ" into a linear dispersion of the different wavelengths along a focal line; and also said individual pathways include inner ends positioned along the focal line; and further said inner ends are connected to said diffraction grating by a planar waveguide.

A method of making a diffraction grating that exhibits a first maximum variation in diffraction efficiency over a transmission bandwidth "Δλ" for a first of two orthogonal directions of polarization and a second maximum variation in diffraction efficiency over the transmission bandwidth "Δλ" for a second of the two orthogonal directions of polarization comprising the steps of: forming a reflective diffraction grating having a plurality of reflective faces for angularly dispersing different wavelengths of the unpolarized light; and orienting the reflective faces at respective blaze angles "$\theta_b$" for substantially retroreflecting normal incident light of a blaze wavelength "$\lambda_b$" that is different from a median wavelength "$\lambda_0$" of the transmission bandwidth "Δλ" by an amount that reduces differences between the first and second maximum variations in diffraction efficiency; in which said step of orienting includes selecting a blaze wavelength "$\lambda_b$" that is longer than the median wavelength "$\lambda_0$"; including the further step of relatively offsetting the reflective faces in the direction of Littrow reflection by an amount equal to one-half of a product of a blaze wavelength "$\lambda_b$" and a diffraction order "m"; and in which the diffraction order is no more than 50 to limit variations in diffraction efficiency within the transmission bandwidth "Δλ"; and including the further step of sizing the reflective faces so that comparable portions of the faces are spaced at a grating pitch "a", which is not less than a multiple of 5 times the blaze wavelength "$\lambda_b$". The method includes the further step of forming: a plurality of side walls interconnecting the reflective faces; first rounded corners having convex reflective profiles joining the faces to the side walls; and second rounded corners having concave reflective profiles joining the faces to the side walls; and the further step of sizing the second rounded corners for minimizing differences between peak diffraction efficiencies in the two orthogonal directions of polarization; and in which the first rounded corners have a radius of curvature "$r_1$", the second rounded corners have a radius of curvature "$r_2$", and said step of sizing includes sizing the radius of curvature "$r_2$" independently of the radius of curvature "$r_1$" within a range of values that varies the peak diffraction efficiency in one of the orthogonal directions of polarization more than the peak diffraction efficiency in the other orthogonal direction of polarization; and also in which said radius of curvature "$r_2$" is sized less than said radius of curvature "$r_1$".

A method of making an optical device that routes different wavelength optical signals of unpolarized light between a common pathway that conveys a plurality of the different wavelength signals and individual pathways that separately convey the different wavelength signals comprising the steps of: interconnecting the common and individual pathways with a diffraction grating exhibiting a first diffraction efficiency in one of two orthogonal directions of polarization and a second diffraction efficiency in the other orthogonal direction of polarization; forming the diffraction grating with a plurality of reflective faces joined by side walls; arranging the reflective faces for converting an angular dispersion of the different wavelength signals into a predetermined linear dispersion of the different wavelength signals along a focal line; aligning inner ends of the individual pathways along the focal line for receiving the different wavelength signals; joining a first end of the reflective faces to the side walls with rounded corners having convex reflective profiles; joining a second end of the reflective faces to the side walls with rounded corners having concave reflective profiles; and sizing the rounded corners having the concave reflective profiles for minimizing differences between the diffraction efficiencies in the two orthogonal directions of polarization and in which the first and second diffraction efficiencies vary as a function of wavelength within a transmission bandwidth "$\Delta\lambda$" and include first and second peak diffraction efficiencies at respective first and second wavelengths; and also in which the rounded corners having the convex profiles have a radius of curvature "$r_1$", the rounded corners having the concave profiles have a radius of curvature "$r_2$", and said step of sizing includes sizing the radius of curvature "$r_2$" independently of the radius of curvature "$r_1$" within a range of values that varies the first peak diffraction efficiency more than the second peak diffraction efficiency for minimizing differences between the first and second peak efficiencies. In the method said radius of curvature "$r_1$" is minimized to reduce insertion losses in both directions of polarization. The method further includes the step of orienting the reflective faces at respective blaze angles "$\theta_b$" for substantially retroreflecting normal incident light of a blaze wavelength "$\lambda_b$" that is different from a median wavelength "$\lambda_0$" of the transmission bandwidth "$\Delta\lambda$" by an amount that reduces a difference between diffraction efficiencies at opposite ends of the transmission bandwidth "$\Delta\lambda$"; and also said step of orienting includes selecting a blaze wavelength "$\lambda_b$" that is longer than the median wavelength "$\lambda_0$".

What is claimed is:

1. An optical device for routing different wavelength signals within a transmission bandwidth "$\Delta\lambda$" comprising:

a common pathway for conveying a plurality of the different wavelength signals;

individual pathways for separately conveying the different wavelength signals;

a diffraction grating interconnecting said common and individual pathways with a first diffraction efficiency in one of two orthogonal directions of polarization and a second diffraction efficiency in the other orthogonal direction of polarization;

said first and second diffraction efficiencies varying as a function of wavelength within the transmission bandwidth "$\Delta\lambda$" between maximum and minimum values having a difference "$\Delta E_{max}$";

said first and second diffraction efficiencies differing from each other at corresponding wavelengths through a maximum difference "$\Delta P_{max}$"; and said reflective diffraction grating including reflective faces that are oriented for balancing the differences "$\Delta E_{max}$" in both directions of polarization and that are shaped for minimizing the difference "$\Delta P_{max}$" between the directions of polarization.

2. A method of making an optical device that routes different wavelength optical signals of unpolarized light between a common pathway that conveys a plurality of the different wavelength signals and individual pathways that separately convey the different wavelength signals comprising the steps of:

interconnecting the common and individual pathways with a diffraction grating exhibiting a first diffraction efficiency in one of two orthogonal directions of polarization and a second diffraction efficiency in the other orthogonal direction of polarization;

forming the diffraction grating with a plurality of reflective faces joined by side walls;

arranging the reflective faces for converting an angular dispersion of the different wavelength signals into a predetermined linear dispersion of the different wavelength signals along a focal line;

aligning inner ends of the individual pathways along the focal line for receiving the different wavelength signals;

joining a first end of the reflective faces to the side walls with rounded corners having convex reflective profiles;

joining a second end of the reflective faces to the side walls with rounded corners having concave reflective profiles; and sizing the rounded corners having the concave reflective profiles for minimizing differences between the diffraction efficiencies in the two orthogonal directions of polarization.

* * * * *